United States Patent [19]

Manzo et al.

[11] Patent Number: 5,414,998
[45] Date of Patent: May 16, 1995

[54] TANDEM MASTER CYLINDER HAVING LITTLE PRESSURE-IMBALANCE

[75] Inventors: Vincenzo Manzo, Modugno; Nicola Tristano, Matera, both of Italy

[73] Assignee: Bendix Altecna S.p.A., Italy

[21] Appl. No.: 90,054

[22] PCT Filed: Jul. 2, 1993

[86] PCT No.: PCT/EP93/01710

§ 371 Date: Jul. 27, 1993

§ 102(e) Date: Jul. 27, 1993

[87] PCT Pub. No.: WO94/01311

PCT Pub. Date: Jan. 20, 1994

[30] Foreign Application Priority Data

Jul. 13, 1992 [IT] Italy ............... TO92A0594

[51] Int. Cl.6 ............... B60T 11/20; F15B 7/00
[52] U.S. Cl. ............... 60/562; 60/581
[58] Field of Search ............... 60/562, 533, 581, 585, 60/592

[56] References Cited

U.S. PATENT DOCUMENTS 3,421,321  1/1969  Lewis .
4,779,422 10/1988  Brown .................. 60/581 X
5,036,751  8/1991  Seip et al. ............ 60/533 X
5,050,382  9/1991  Burgdorf et al. ...... 60/562 X
5,179,834  1/1993  Rauschenbach ........ 60/562 X

FOREIGN PATENT DOCUMENTS 708098  9/1965  Canada ................. 60/562
1048169  3/1956  Germany .
1480463  3/1970  Germany .
2313375  9/1974  Germany .
1102562  2/1968  United Kingdom ..... 60/562
2459146  2/1981  United Kingdom ..... 60/562
2169368  7/1986  United Kingdom .

Primary Examiner—Edward K. Look
Assistant Examiner—Hoang Nguyen
Attorney, Agent, or Firm—Larry J. Palguta; Leo H. McCormick, Jr.

[57] ABSTRACT

Tandem master cylinder comprises primary and secondary pistons (3,4) moved apart by means of two springs (9, 10). Only one (9) of the two springs is prestressed in the rest position of the piston. The pressures in the primary 6 and secondary 7 chambers are thus very rapidly made similar to each other, without it being necessary to mount the springs in a cage of adjustable length.

5 Claims, 2 Drawing Sheets

TANDEM MASTER CYLINDER HAVING LITTLE PRESSURE-IMBALANCE

The present invention relates to a hydraulic tandem master cylinder comprising:
  a body drilled through by an essentially cylindrical bore closed by an end-cap;
  primary and secondary pistons capable of sliding in the bore, in a sealed fashion, from a rest position in which these pistons are furthest away from the end-cap as far as at least an actuation position in which these pistons are moved closer to the end-cap;
  a primary hydraulic pressure chamber defined between the primary and secondary pistons, this chamber containing first elastic means having a predetermined stiffness and exerting a first elastic force between the pistons in a direction which tends to move these pistons apart;
  a secondary hydraulic pressure chamber defined between the secondary piston and the end-cap, this chamber containing second elastic means having a predetermined stiffness and exerting a second elastic force between the secondary piston and the end-cap in a direction which tends to move this piston away from the end-cap,
  the first and second forces varying, for a movement of the pistons from the rest position to said actuation position, from respective low values to respective high values, the low value of the second force being greater than that of the first force, whereas the high value of the second force is less than that of the first force.

Master cylinders of this type have been used for very many years in dual braking circuits for motor vehicles, and Patent GB 2,169,368 provides a relatively recent example of this.

One problem which conventionally arises in tandem master cylinders is to make the pressure in the secondary chamber as close as possible to that which prevails in the primary chamber for as short a stroke of the primary piston as possible.

The difficulty to be overcome in order to solve this problem lies in the fact that the primary spring has, a priori, to be as stiff as possible so that the actuation of the primary piston rapidly drives that of the secondary piston by compressing the secondary spring, whereas the secondary spring has nevertheless to be quite stiff in order to enable the secondary piston, in the absence of actuation, to return to its rest position.

This problem is conventionally solved, as Patent GB 2,169,368 shows, by compressing at least the primary spring in a cage which can be deformed in compression but the maximum length of which is adjusted and predetermined as a function of the maximum distance between the primary and secondary pistons.

The object of the present invention is to provide means which make it possible to dispense with the use of such cages and with the fitting and adjustment operations which they require.

This object itself gives rise to two new difficulties connected with the absence of adjustment, the first stemming from the fact that the stiffness of the springs, in the absence of measurement, is only known with a relatively large uncertainty, and the stemming from the mechanical tolerances of the manufactured components and which themselves lead to a degree of uncertainty in the length of the springs, in the maximum distance between the pistons, etc.

In order to overcome these difficulties, the tandem master cylinder of the invention is essentially characterized in that the first elastic means essentially comprise:
  a first prestressed spring suitable for exerting, by itself, in the rest position of the pistons, at least the greatest part of the low value of the first force, this first prestressed spring having a stiffness at least equal to that of the second elastic means, and
  an additional spring suitable for developing, for the position for actuating the pistons, a force which is added to that of the prestressed spring and which is several times greater than that which this additional spring develops for the rest position of the pistons.

The second elastic means may then quite simply comprise a second prestressed spring, of lower stiffness than that of the first prestressed spring.

The first prestressed spring and the additional spring are advantageously arranged one inside the other, the second preferably being inside the first.

Furthermore, it is advantageous for these springs to be coiled in opposite directions so as to prevent any catching of one on the other.

Other characteristics and advantages of the invention will clearly emerge from the description which is made of it hereinbelow, by way of indication and by no means of limitation, with reference to the accompanying drawings in which.

Figure 1:
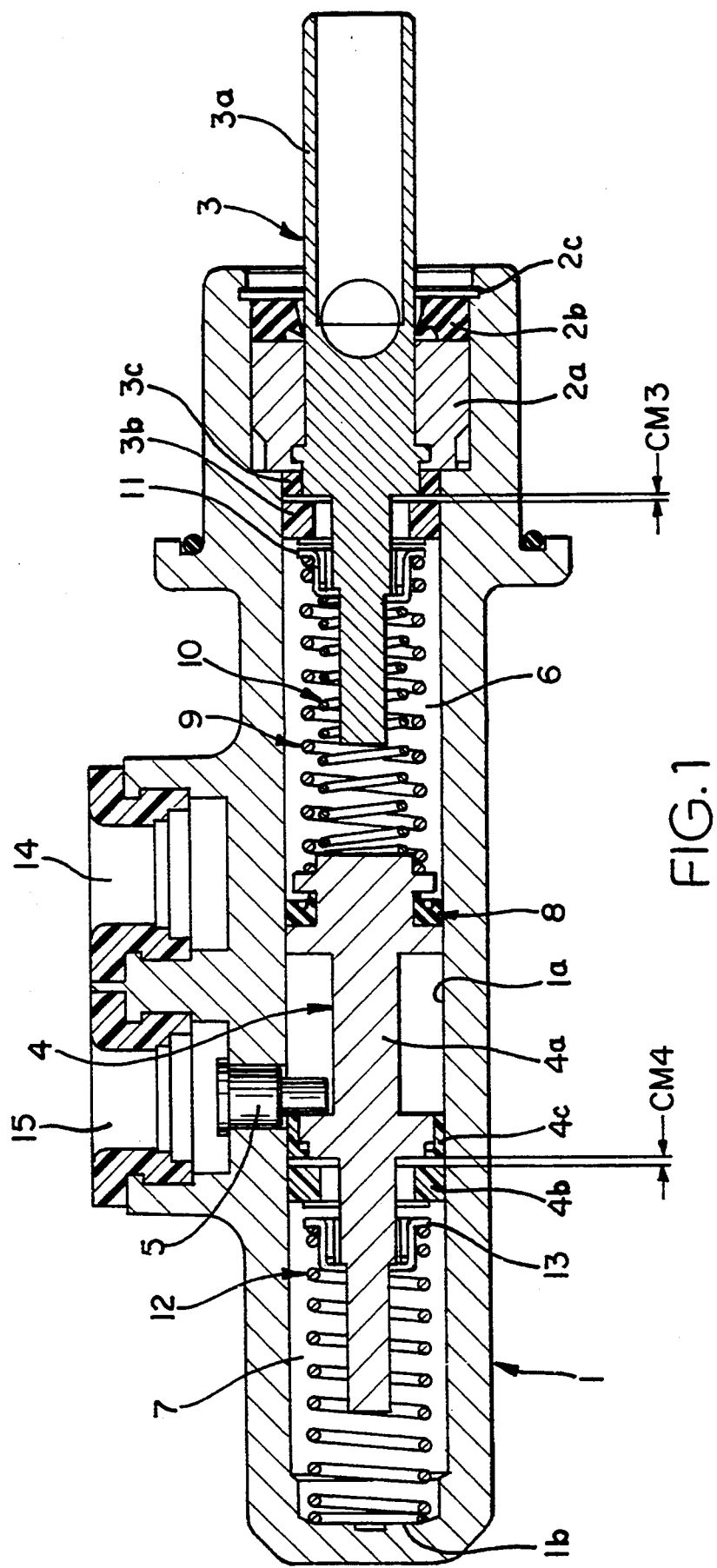
FIG. 1 is a sectional view of a tandem master cylinder in accordance with the invention.

The tandem master cylinder of the invention being noteworthy only regarding very precise points which will be explained in detail later with reference to FIGS. 2 and 3, the master cylinder of FIG. 1 resembles overall all known tandem master cylinders, and its description will therefore not be burdened with details which are well known to the person skilled in the art and which are not relevant to the context of the invention.

This tandem master cylinder essentially comprises a body 1 drilled through by a longitudinal and cylindrical bore 1a closed by an end-cap 1b and by end members 2a, 2b, 2c sealing the bore 1a on the side where it is open.

A primary piston 3, including a rod 3a and seals 3b, 3c, can slide in a sealed fashion in the bore 1a, from a rest position (that shown in FIG. 1) as far as an arbitrary actuation position A (piston moved to the left, in FIG. 1), which is determined by the magnitude of an external force applied to the rod 3a, which passes through the end members 2a, 2b, 2c.

Likewise, a secondary piston 4, including a rod 4a and sealing members 4b, 4c, slides in a sealed fashion in the bore 1a, from a rest position (that of FIG. 1) in which this piston is halted by a stop 5, as far as an arbitrary actuation position A (piston moved to the left in FIG. 1), in which this piston is closer to the end-cap 1b.

The intermediate volume 6 between the primary and secondary pistons 3 and 4 defines a primary hydraulic pressure chamber, and the volume 7 lying between the secondary piston 4 and the end-cap 1b of the bore defines a secondary hydraulic pressure chamber.

The primary chamber 6 is sealed with respect to the secondary chamber 7 by means of a seal 8 fixed to the rod 4a of the secondary piston.

First elastic means 9, 10, pressing on one side on a sealing cup 11 rigidly attached to the rod 3a of the primary piston and on the other side on a shoulder of the rod 4a of the secondary piston, exert a first elastic force between the primary and secondary pistons in a direction which tends to move these pistons apart.

Likewise, second elastic means 12, pressing on one side on a sealing cup 13 rigidly attached to the rod 4a of the secondary piston and on the other side on the end-cap 1b of the bore, exert, between this end-cap and the secondary piston 4, a force which tends to move this piston away from the end-cap.

The operation of the tandem master cylinder is as follows. In the rest position of the pistons 3 and 4, the primary and secondary chambers 6 and 7 communicate with respective brake-fluid reservoirs (not shown), through the respective openings 14 and 15, and pipes, not shown. These chambers are therefore full of brake fluid.

When a sufficient force is exerted towards the left on the rod 3a, the primary piston 3 is moved into a position for which the primary chamber 6 no longer communicates with the opening 14. The pressure increases in this chamber and becomes communicated, through pipes which are not visible in the figure, to two wheel cylinders which actuate the corresponding brakes of the vehicle.

The secondary piston 4, which firstly receives a part of the actuation force of the primary piston 3 through the first elastic means 9, 10 and then the force resulting from the increase in pressure in the primary chamber 6, is moved in turn towards the end-cap 1b, in opposition to the force exerted by the spring 12. The pressure then increases in the secondary chamber 7 and becomes communicated, through pipes which are not visible in the figure, to two other wheel cylinders which actuate the corresponding brakes of the vehicle.

In this known general context, the invention aims to provide means as simple and inexpensive as possible which make it possible to make the pressure in the secondary chamber 7 follow, as closely as possible and for as short a stroke of the primary piston 3 as possible, the pressure in the primary chamber 6.

In particular, it is important for the lost motion CM3 of the primary piston 3 to remain very small and for the secondary piston 4 to compensate for its lost motion CM4 as quickly as possible after the actuation of the primary piston 3.

Figure 2:
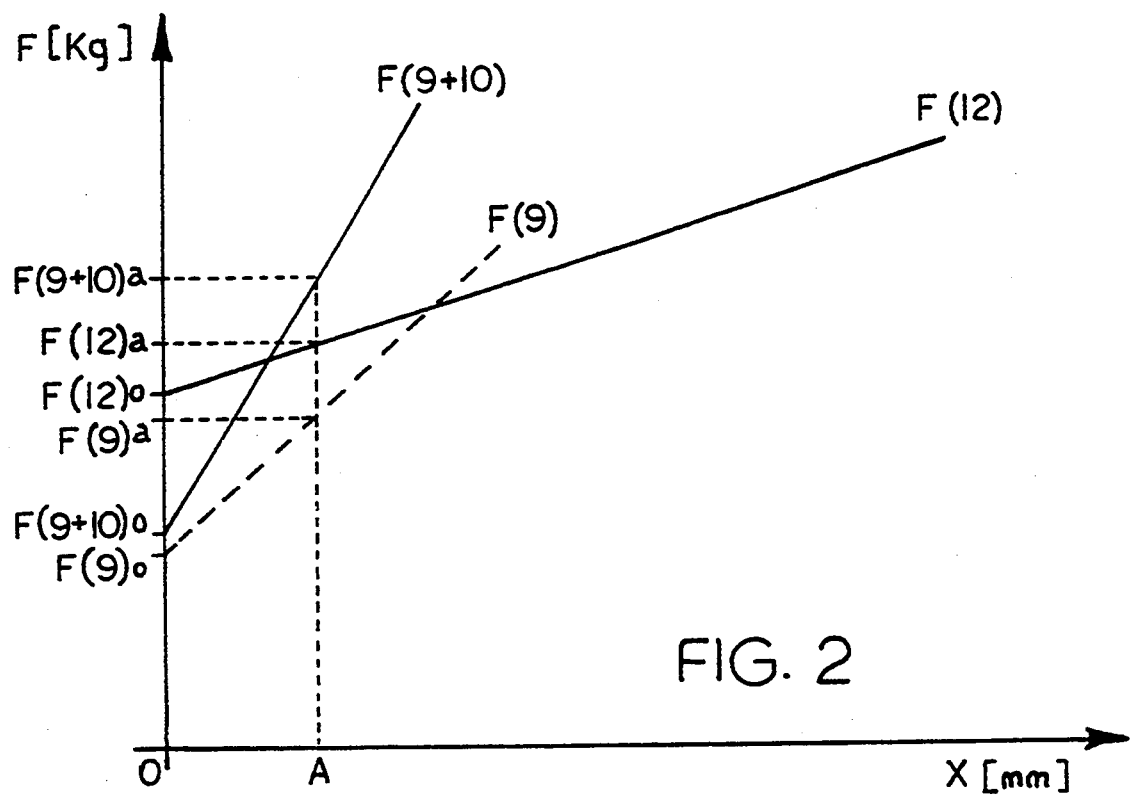
FIG. 2 is a diagram showing the forces (in kilograms) exerted by various springs as a function of their deformation X in millimeters.
Figure 3:
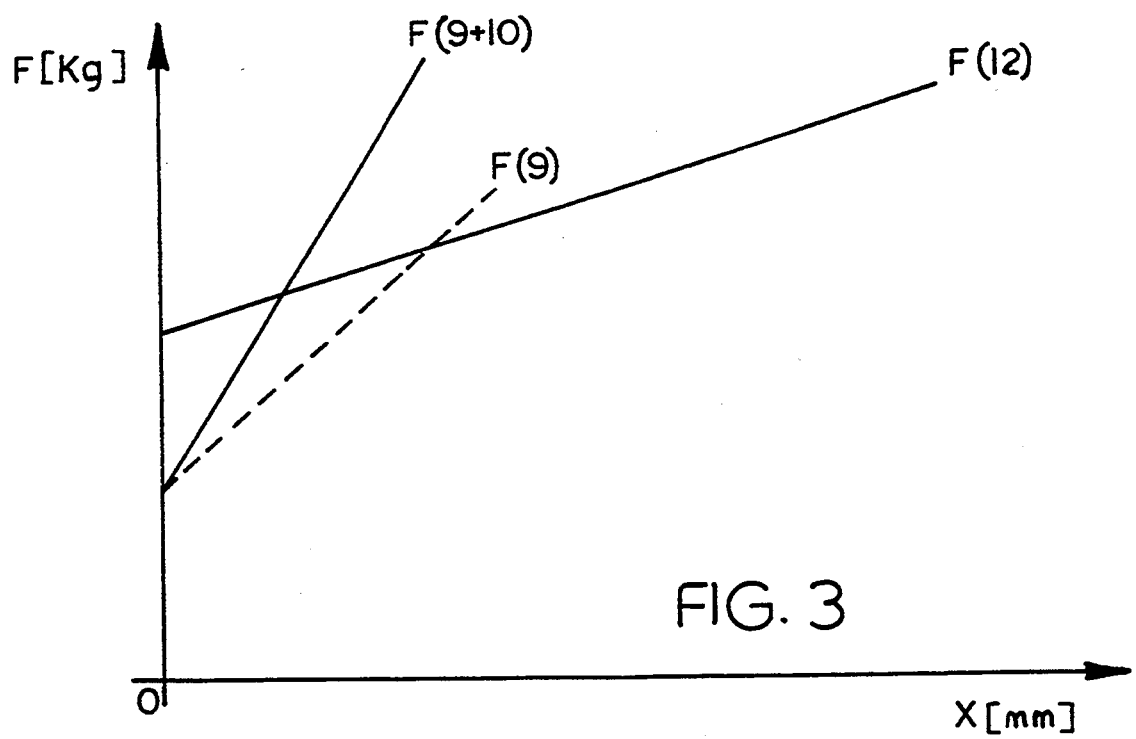
FIG. 3 is a variant of FIG. 2.

In order to do this, the first elastic means 9, 10 are essentially constituted by a first prestressed spring 9 and an additional spring 10, and the second elastic means 12 are essentially constituted by the second prestressed spring 12, these springs having the features identified in FIGS. 2 and 3.

More precisely, the first and second springs 9 and 12 are prestressed, in the rest positions of the pistons, in such a manner that the force $F(9)_o$ or load at the seat, then exerted by the first spring 9, is appreciably less than the load at the seat $F(12)_o$ exerted by the second spring 12 and, for example, at most equal to three quarters of the latter.

On the other hand, the stiffness of the first prestressed spring 9, that is to say the slope of the curve (generally straight) which represents the variation of the force $F(9)$ exerted by this spring as a function of its deformation X, is appreciably greater than that of the second prestressed spring 12 and, for example, equal to at least twice the latter.

Moreover, the additional spring 10 is mounted with a load at the seat $F(10)_o = F(9+10)_o - F(9)_o$, which is as small as possible and ideally zero, but has a length such that it exerts, as soon as the primary piston 3 moves, a force $F(10) = F(9+10) - F(9)$, which is added to the force $F(9)$ of the spring 9 and which rapidly becomes several times greater than the load at the seat $F(10)_o$.

As FIG. 2 shows, and assuming the index "a" is assigned to the forces being exerted for the actuation position A, these features lead to:

$F(9+10)_a > F(12)_a$, even though $F(12)_a > F(9)_a$.

FIGS. 2 and 3 enable the advantage of the invention to be better appreciated.

As a matter of fact, it would seem in theory that the springs 9 and 10 are equivalent to a spring of load at the seat $F(9+10)_o$ and of stiffness corresponding to the slope of the straight line $F(9+10)$, and therefore can be replaced by such a single spring.

In practice, this is not the case, for the reasons already mentioned.

First of all, in the absence of measurement, the uncertainty in the stiffness of a spring increases as the value of the stiffness increases.

In addition, the uncertainty in the load at the seat of a prestressed spring varies, as a function of the uncertainty in the length of this spring at rest and when stressed, as the stiffness of this same spring increases.

The present invention is therefore not limited to combining several springs of average stiffness in order to obtain, as is the case in Patent GB 2,169,368, an equivalent spring of greater stiffness, but uncouples the load-at-the-seat effect from the overall-stiffness effect by using two springs in order to simplify the manufacture of tandem master cylinders and to limit the variance of their features.

FIG. 2 illustrates the case where the additional spring 10, because of dimensional tolerances, is mounted with a light seat load, whereas FIG. 3 illustrates the case where this spring 10, still for the same extraneous reason [sic], is mounted with a degree of play.

As shown by examining these figures, the overall effect of these manufacturing uncertainties is minimal in the case of the invention, whereas it would be considerable in the case of the use of a single primary spring.

As FIG. 1 shows, the additional spring 10 is preferably mounted inside the first prestressed spring 9, concentric with it, and its direction of coiling is opposite that of this first prestressed spring 9.

We claim:
1. A hydraulic tandem master cylinder comprising:
a body having a cylindrical bore closed by an end-cap;
primary and secondary pistons capable of sliding in the bore in a sealed fashion, from a rest position in which the pistons are furthest away from the end-cap and as far as at least one actuation position in which the pistons are moved closer to the end-cap;
a primary hydraulic pressure chamber defined between the primary and secondary pistons, the chamber containing first elastic means having a predetermined stiffness and exerting a first elastic force between the pistons in a direction which tends to move the pistons apart;

a secondary hydraulic pressure chamber defined between the secondary piston and the end-cap, the secondary hydraulic chamber containing second elastic means having a predetermined stiffness and exerting a second elastic force between the secondary piston and the end-cap in a direction which tends to move the secondary piston away from the end-cap, the first and second elastic forces varying, for movement of the pistons from the rest position to said actuation position, from respective low values up to respective high values, the low value of the second force being greater than that of the first elastic force, whereas the high value of the second elastic force is less than that of the first elastic force, characterized in that the first elastic means comprises:

a first prestressed spring suitable for exerting, by itself, in the rest position of the pistons, at least a greatest part of the low value of the first elastic force, the first prestressed spring having a stiffness at least equal to that of the second elastic means, and an additional spring suitable for developing, for the actuation of the pistons, a force which is added to that of the first prestressed spring and which is several times greater than that which the additional spring develops for the rest position of the pistons.

2. The master cylinder according to claim 1, characterized in that the second elastic means comprises a second prestressed spring of stiffness less than that of the first prestressed spring.

3. The master cylinder according to claim 2, characterized in that the first prestressed spring and the additional spring are arranged one inside the other.

4. The master cylinder according to claim 3, characterized in that the additional spring is housed inside the first prestressed spring.

5. The master cylinder according to claim 3, characterized in that the additional spring and the first prestressed spring are coiled in opposite directions.

* * * * *